United States Patent
Nguyen et al.

(10) Patent No.: US 7,453,818 B2
(45) Date of Patent: Nov. 18, 2008

(54) DETECTION OF POTENTIAL FORWARDING LOOPS IN BRIDGED NETWORKS

(75) Inventors: Hien Nguyen, Fremont, CA (US);
Rodney Fong, Pleasanton, CA (US);
Ravikanth Samprathi, Santa Clara, CA (US); Stanley Tang, Millbrae, CA (US)

(73) Assignee: Cisco Technology, Inc., San Jose, CA (US)

( * ) Notice: Subject to any disclaimer, the term of this patent is extended or adjusted under 35 U.S.C. 154(b) by 305 days.

(21) Appl. No.: 11/416,348

(22) Filed: May 1, 2006

(65) Prior Publication Data
US 2007/0253346 A1    Nov. 1, 2007

(51) Int. Cl.
*G06F 11/00* (2006.01)
(52) U.S. Cl. .................. 370/248; 370/256; 370/401; 709/221; 709/222
(58) Field of Classification Search ............. 370/248, 370/255, 256, 401; 709/220, 221, 222
See application file for complete search history.

(56) References Cited

U.S. PATENT DOCUMENTS

| | | | | |
|---|---|---|---|---|
| 5,790,808 A * | 8/1998 | Seaman | ..................... | 709/223 |
| 6,023,563 A * | 2/2000 | Shani | ......................... | 709/249 |
| 6,519,231 B1 * | 2/2003 | Ding et al. | ................... | 370/256 |
| 6,526,044 B1 * | 2/2003 | Cookmeyer et al. | ......... | 370/352 |
| 6,535,491 B2 * | 3/2003 | Gai et al. | .................... | 370/256 |
| 6,628,624 B1 * | 9/2003 | Mahajan et al. | ............ | 370/256 |
| 6,937,576 B1 * | 8/2005 | Di Benedetto et al. | ...... | 370/256 |
| 7,061,875 B1 * | 6/2006 | Portolani et al. | ............ | 370/256 |
| 7,072,952 B2 * | 7/2006 | Takehiro et al. | ............. | 709/221 |
| 7,126,923 B1 * | 10/2006 | Yang et al. | .................. | 370/256 |
| 7,127,523 B2 * | 10/2006 | Kotser | ........................ | 709/238 |
| 7,385,939 B2 * | 6/2008 | Duncan et al. | .............. | 370/256 |
| 2003/0223379 A1 * | 12/2003 | Yang et al. | .................. | 370/256 |
| 2006/0045091 A1 * | 3/2006 | Hata | .......................... | 370/392 |

* cited by examiner

*Primary Examiner*—Hassan Kizou
*Assistant Examiner*—Brian T O'Connor
(74) *Attorney, Agent, or Firm*—The Law Office of Kirk D. Williams (57) ABSTRACT

Potential forwarding loops in bridged networks are detected. A switch monitors the movement of packet addresses in the forwarding table to different ports. If the port associated with an address changes multiple times in a short time duration, then a potential forwarding loop is detected, and a loop corrector is notified to take appropriate action to correct the problem, such as, but not limited to changing the state of a port to a blocking state or disabling an interface, etc. If there are multiple movements outside the short time duration, they may be correct movements adjusting to the actual reconfiguration of a network, and thus, these movements are effectively filtered out of consideration.

26 Claims, 7 Drawing Sheets

DETECTION OF POTENTIAL FORWARDING LOOPS IN BRIDGED NETWORKS

TECHNICAL FIELD

One embodiment of the invention relates to communications and computer systems, especially routers, packet switching systems, and other devices; and more particularly, one embodiment relates to the detection of potential forwarding loops in bridged networks.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Figure 1:
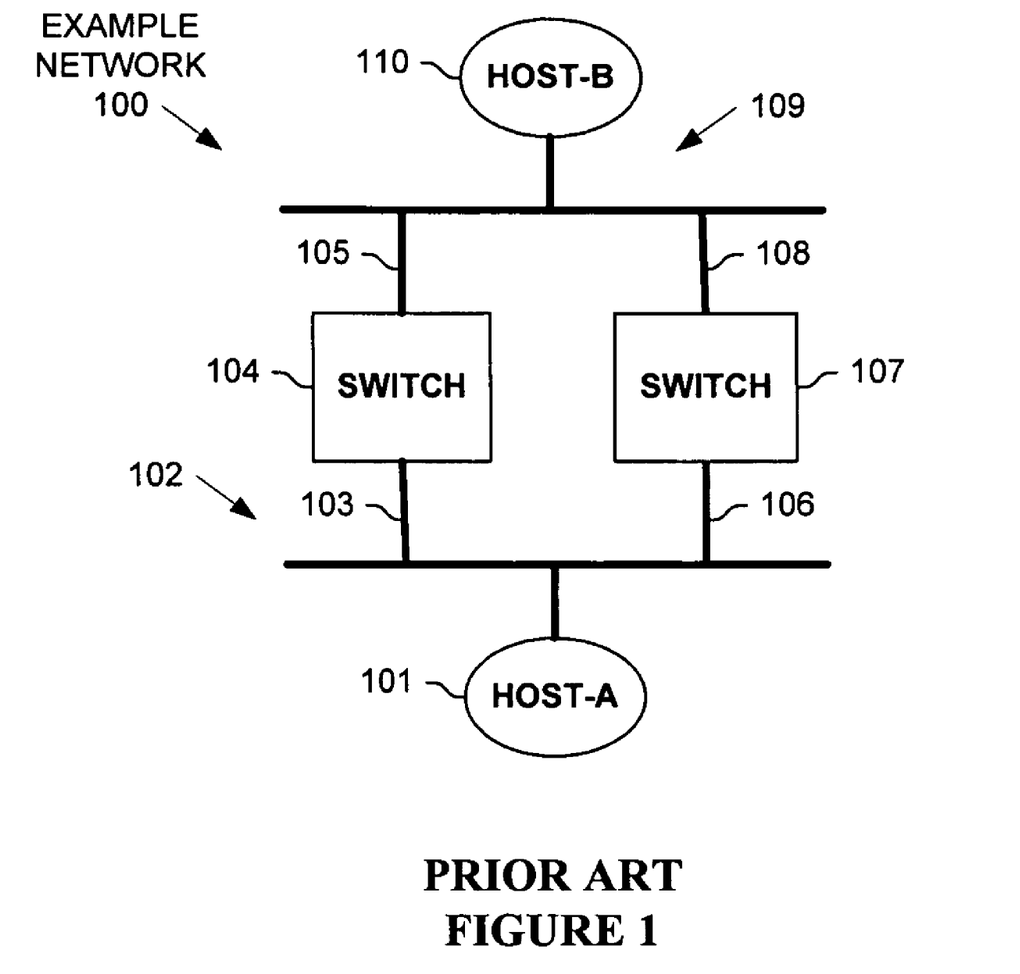
FIG. 1 is a block diagram of a prior art network configuration.

FIG. 1 illustrates a standard prior art network configuration 100 with two hosts 101, 110 each located on two different portions 102, 109 of a network which are bridged by switches 104 and 107. At any time, only one of these two switches 104, 107 should be forwarding packets between these two different network portions 102, 109 to avoid a forwarding a loop. For example, one of the ports corresponding to links 105, 108 should be in a blocking state so that switch 104, 107 does not lean an incorrect location of a node or other networked device; otherwise, both switches 104 and 107 will be reading source address of packets and updating its forwarding table accordingly, which will typically cause the learning of the wrong location of host-A 101. If the port corresponding to link 108 is in the blocking state, switches 104, 107 will correctly learn the location of host-A 101 based on a packet sent from host-a 101 to host-B 110 as both switches will see and learn the source media access control (MAC) address based on the packet being received on ports corresponding to links 103 and 106, respectively. If, however, the port corresponding to link 108 is not in the blocking state (which should never happen, but may occasionally occur due to a hardware or software error), switch 107 will also see and learn the source MAC address also on the port corresponding to link 108. Thus, switch 107 may attempt to forward packets to host-A 101 via the wrong port and onto link 108.

SUMMARY

Disclosed are, inter alia, methods, apparatus, data structures, computer-readable media, mechanisms, and means for detecting potential forwarding loops in bridged networks. One embodiment monitors the movement of packet addresses in the forwarding table to different ports. If the port associated with an address changes multiple times in a short time duration, then a potential forwarding loop is detected, and a loop corrector is notified to take appropriate action to correct the problem, such as, but not limited to changing the state of a port to a blocking state or disabling an interface, etc. If there are multiple movements outside the short time duration, they may be correct movements adjusting to the actual reconfiguration of a network, and thus these movements are effectively filtered out of consideration. One embodiment monitors this movement of addresses using a moved data structure to track multiple movements within a short time duration (either directly or a movement in each of multiple consecutive time intervals). In one embodiment, the length of the time duration is selected based on characteristics (e.g., the Hello time, the Forwarding Delay, etc.) of the employed Spanning Tree Protocol (e.g., any version and/or variant of the Spanning Tree Protocol).

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Disclosed are, inter alia, methods, apparatus, data structures, computer-readable media, mechanisms, and means for detecting potential forwarding loops in bridged networks. Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in industry as a sub-inter-face—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, mechanisms, and means for detecting potential forwarding loops in bridged networks. One embodiment monitors the movement of packet addresses in the forwarding table to different ports. If the port associated with an address changes multiple times in a short time duration, then a potential forwarding loop is detected, and a loop corrector is notified to take appropriate action to correct the problem, such as, but not limited to changing the state of a port to a blocking state or disabling an interface, etc. If there are multiple movements outside the short time duration, they may be correct movements adjusting to the actual reconfiguration of a network, and thus, these movements are effectively filtered out of consideration. One embodiment monitors this movement of addresses using a moved data structure to track multiple movements within a short time duration (either directly or a movement in each of multiple consecutive time intervals). In one embodiment, the length of the time duration is selected based on characteristics (e.g., the Hello time, the Forwarding Delay, etc.) of the employed Spanning Tree Protocol (e.g., any version and/or variant of the Spanning Tree Protocol).

One embodiment that identifies potential forwarding loops in a network, includes: multiple packet receivers (e.g., ports, interfaces, etc.) configured to receive packets, with each of the received packets including a source address; a forwarding data structure configured for storing associations of the addresses with particular packet receivers; a network topology updater configured to perform Spanning Tree Protocol including sending of Hello messages at intervals of a predetermined Hello time and to update the forwarding data structure; a moved data structure configured for storing addresses whose corresponding packet receiver has recently moved; and a loop detector configured to manage recently moved addresses using the moved data structure in order to identify a potential routing loop when a movement for a same address has occurred n times within a predefined time duration, wherein n is at least two, wherein the predefined time duration is less or equal to approximately twice the Hello time; wherein the loop detector is configured to notify a loop corrector to respond to the identification of the potential routing loop.

In one embodiment, the Hello time is approximately two seconds. In one embodiment, the Hello time is approximately one second. One embodiment includes the loop corrector responsive to the identification of the potential routing loop by the loop detector. In one embodiment, the loop corrector causes a particular packet receiver to be put in the blocking state in response to the identification of the potential routing loop by the loop detector. In one embodiment, the loop corrector determines the particular packet receiver based on information extracted from the moved data structure.

One embodiment that identifies potential forwarding loops in a network, includes: multiple packet receivers (e.g., ports, interfaces, etc.) configured to receive packets, with each of the received packets including a source address; a forwarding data structure configured for storing associations of the addresses with particular packet receivers; a moved data structure configured for storing addresses whose corresponding packet receiver has recently moved with corresponding one or more indications for identifying movements in different consecutive time intervals; and a loop detector configured to manage recently moved addresses using the moved data structure so as to identify a potential routing loop when a movement for a same address has occurred in each of n consecutive time intervals, with n being greater than one; wherein the loop detector is configured to notify a loop corrector to respond to the identification of the potential routing loop.

One embodiment includes a network topology updater configured to perform Spanning Tree Protocol including sending of Hello messages at time intervals of a predetermined Hello time and to update the forwarding data structure; and wherein each of the consecutive time intervals is approximately the predetermined Hello time. In one embodiment, n is two. In one embodiment, n is two, and each of the consecutive time intervals is approximately one second. One embodiment includes a network topology updater configured to perform Spanning Tree Protocol including sending of Hello messages at time intervals of a predetermined Hello time of approximately one second and to update the forwarding data structure. One embodiment includes a network topology updater configured to perform Spanning Tree Protocol, wherein each of the consecutive time intervals is less than half of the predetermined Forwarding Delay for the Spanning Tree Protocol for the apparatus. One embodiment includes a network topology updater configured to perform Spanning Tree Protocol, wherein each of the consecutive time intervals is less than one-fourth of the predetermined Forwarding Delay for the Spanning Tree Protocol for the apparatus. One embodiment includes a network topology updater configured to perform Spanning Tree Protocol, wherein each of the consecutive time intervals is less than one-tenth of the predetermined Forwarding Delay for the Spanning Tree Protocol for the apparatus.

A networked packet switching device is configured to identify potential forwarding loops in a network. The packet switching device includes packet receivers, a forwarding data structure configured for storing associations of addresses with particular packet receivers; and a moved data structure configured for storing addresses whose corresponding packet receiver has recently moved. One embodiment: repeatedly receives and processes a new particular packet. The particular packet includes a particular source address in the source address field in the header of the particular packet identifying the source of the packet. The processing of the particular packet includes: evaluating the forwarding data structure for the particular source address, and in response to an identification that a particular packet receiver associated with the particular source address has moved from a prior particular packet receiver based on the forwarding data structure and the particular source address extracted from the particular packet, the moved data structure is updated to reflect that the packet receiver associated with the particular source address has moved, wherein the forwarding data structure is updated for the particular source address the associated packet receiver at least when said move is detected. Recently moved addresses identified in the moved data structure are periodically evaluated to evaluating in order to identify a potential routing loop when a movement for a same address has occurred n times within a predefined time duration, with n being an integer of at least two. In response to the identification of the potential routing loop, a loop corrector configured to respond to said identification of the potential routing loop is notified.

One embodiment performs Spanning Tree Protocol, which includes sending of Hello messages at time intervals of a predetermined Hello time and updating the forwarding data structure; and wherein the predefined time duration is less or equal to approximately twice the Hello time. One embodiment performs Spanning Tree Protocol, which includes sending of Hello messages at time intervals of a predetermined Hello time and updating the forwarding data structure; and wherein the predefined time duration is less or equal to approximately the Hello time.

One embodiment, configured to identify potential forwarding loops in a network, includes: packet receivers; a forwarding data structure configured for storing associations of addresses with particular packet receivers; a moved data structure configured for storing addresses whose corresponding packet receiver has recently moved; means for repeatedly processing a received new particular packet; and means for identifying a potential routing loop when a movement for a same address has occurred in each of n consecutive time intervals and for notifying a loop corrector to respond to the identification of the potential routing loop, with n being an integer greater than one. The particular packet includes a particular source address in the source address field in the header of the particular packet identifying the source of the packet. Processing of the particular packet includes: evaluating the forwarding data structure for the particular source address, and in response to an identification that a particular packet receiver associated with the particular source address has moved from a prior particular packet receiver based on the forwarding data structure and the particular source address extracted from the particular packet, updating the moved data structure to reflect that the packet receiver associated with the particular source address has moved; wherein the forwarding data structure is updated for the particular source address the associated said one of the packet receivers at least when said move is detected.

One embodiment includes a network topology updater configured to perform Spanning Tree Protocol including sending of Hello messages at time intervals of a predetermined Hello time and to update the forwarding data structure; and wherein each of said consecutive time intervals is approximately the predetermined Hello time. In one embodiment, n is two. In one embodiment, n is two, and each of said consecutive time intervals is approximately one second. One embodiment includes a network topology updater configured to perform Spanning Tree Protocol including sending of Hello messages at time intervals of a predetermined Hello time of approximately one second and to update the forwarding data structure. One embodiment includes a network topology updater configured to perform Spanning Tree Protocol, wherein each of said consecutive time intervals is less than half of the predetermined Forwarding Delay for the Spanning Tree Protocol for the apparatus. One embodiment includes a network topology updater configured to perform Spanning Tree Protocol, wherein each of said consecutive time intervals is less than one-fourth of the predetermined Forwarding Delay for the Spanning Tree Protocol for the apparatus. One embodiment includes a network topology updater configured to perform Spanning Tree Protocol, wherein each of said consecutive time intervals is less than one-tenth of the predetermined Forwarding Delay for the Spanning Tree Protocol for the apparatus.

Figure 2A:
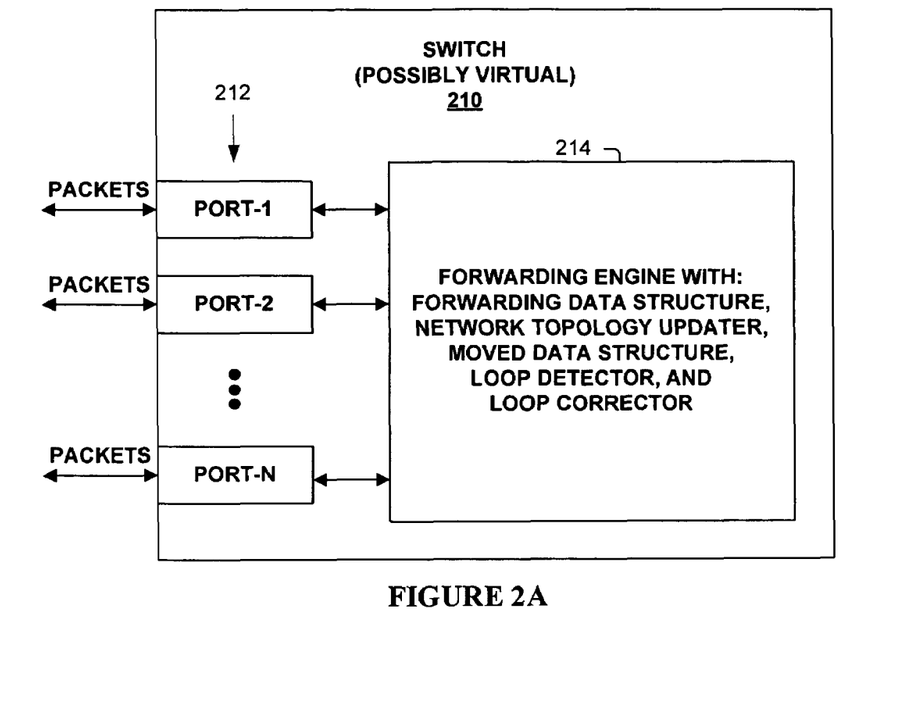
FIGS. 2A-C are block diagrams illustrating a few of an extensible number of different switches employing a loop detector of one embodiment.

Turning to the figures, FIG. 2A illustrates a switch (possibly a virtual switch) 210 which sends and receives packets on ports 212, and includes a forwarding engine 214, which includes a forwarding data structure, a network topology updater, a moved data structure, a loop detector, and a loop corrector.

Figure 2B:
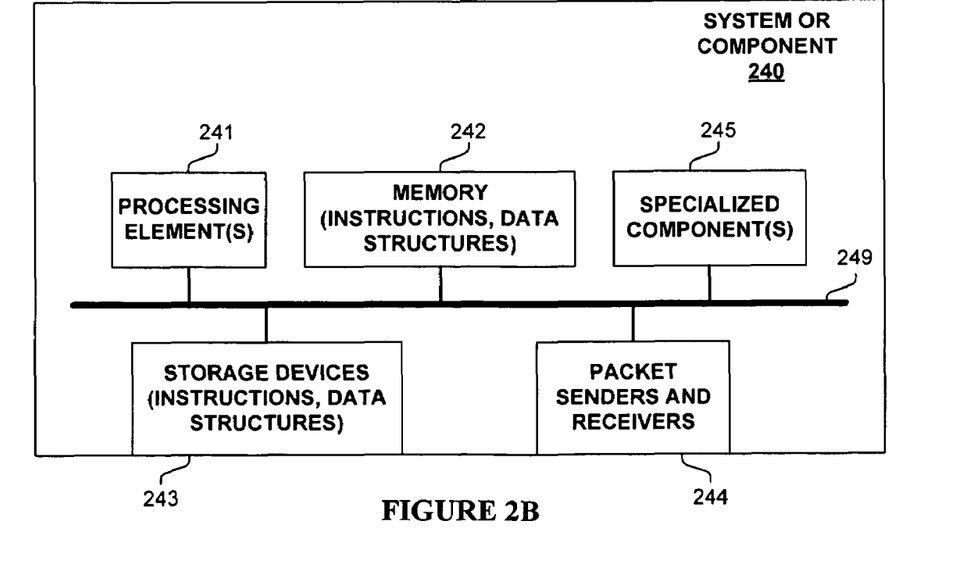

FIG. 2B is block diagram of a system or component 240 used in one embodiment that detects potential forwarding loops in bridged networks. In one embodiment, system or component 240 performs one or more processes corresponding to one of the flow diagrams illustrated or otherwise described herein.

In one embodiment, system or component 240 includes one or more processing elements 241, memory 242, storage devices 243, packet receivers/senders configured to send and receiver packets 244, and specialized components 245, which are typically communicatively coupled via one or more communications mechanisms 249, with the communications paths typically tailored to meet the needs of the application.

Various embodiments of component 240 may include more or less elements. The operation of component 240 is typically controlled by processing element 241 using memory 242 and storage devices 243 to perform one or more tasks or processes. Memory 242 is one type of computer-readable medium, and typically comprises random access memory (RAM), read only memory (ROM), flash memory, integrated circuits, and/or other memory components. Memory 242 typically stores computer-executable instructions to be executed by processing element 241 and/or data which is manipulated by processing element 241 for implementing functionality in accordance with an embodiment. Storage devices 243 are another type of computer-readable medium, and typically comprise solid state storage media, disk drives, diskettes, networked services, tape drives, and other storage devices. Storage devices 243 typically store computer-executable instructions to be executed by processing element 241 and/or data which is manipulated by processing element 241 for implementing functionality in accordance with an embodiment.

Figure 2C:
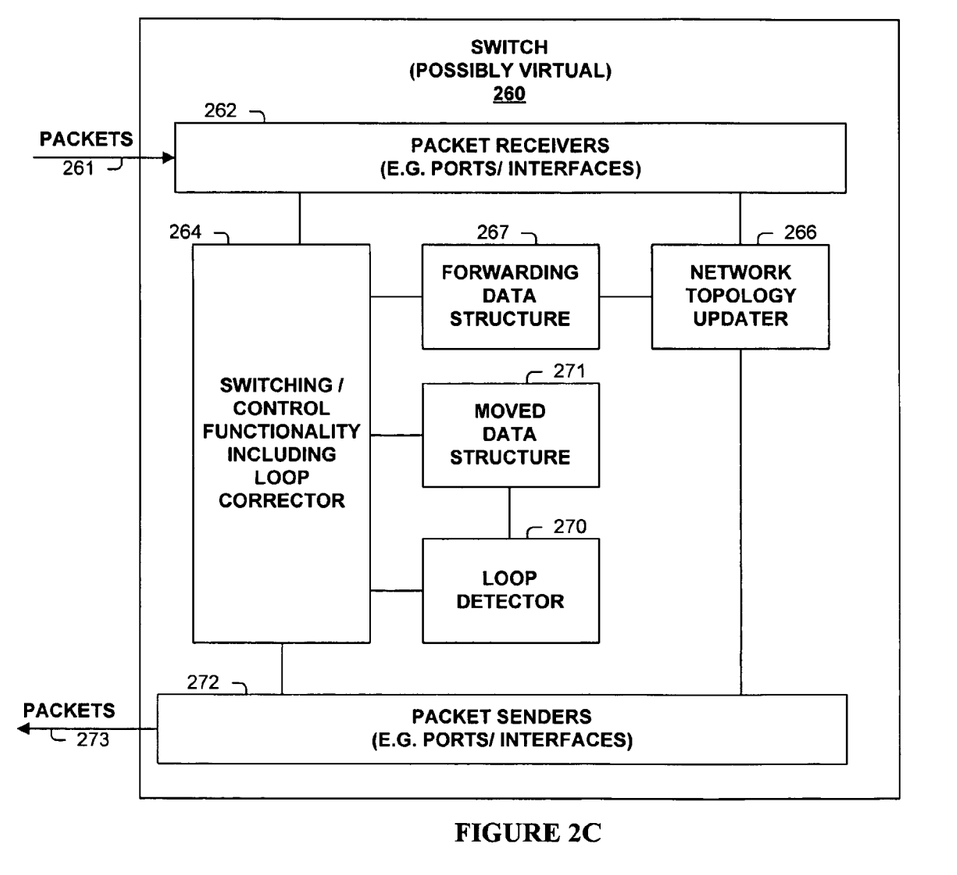

FIG. 2C illustrates a switch (possibly a virtual switch) 260 which receives packets 261 on packet receivers 262 (e.g., ports, interfaces, etc.). Network topology updater 266, typically runs Spanning Tree Protocol (e.g., any version and/or variant of the Spanning Tree Protocol) or another protocol, to maintain a representation of the network topology in forwarding data structure 267. For a received packet, such as one to be forwarded to another network, switching/control functionality 264 performs, inter alia, a lookup operation on forwarding data structure 267 based on the source address of the received packet. If the source address was not found or the identified packet receiver has changed from that represented in forwarding data structure 267, typically forwarding data structure 267 is updated to reflect this association between the address and the particular packet receiver on which the packet was received. Additionally, if the particular packet receiver on which the packet was received was different than that identified in forwarding data structure 267 (before the update), then moved data structure 271 is updated to reflect this movement. If the packet is to be forwarded, the forwarding information is retrieved from forwarding data structure 267, with the packet (273) being forwarded out one of the packet senders 272. Periodically, occasionally, or in response to some event (e.g., a detection of some number of movements, an interrupt, a timer expiration, etc.), loop detector 270 evaluates the information in moved data structure 271 to determine whether or not a potential forwarding loop exits, and if so, typically notifies loop corrector (264) so appropriate corrective action can be taken (e.g., analyzing the data and in response, block or disable a problem packet receiver).

Figure 3:
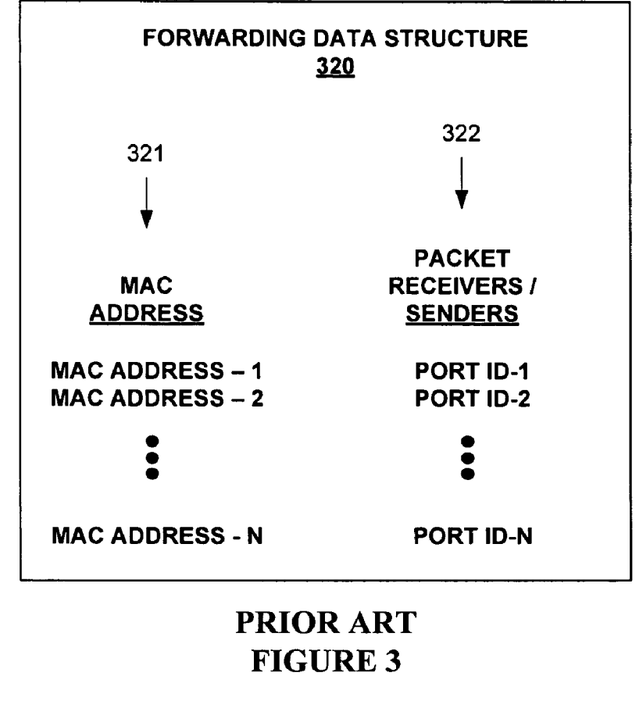
FIG. 3 is a block diagram of a basic prior art forwarding table.

FIG. 3 illustrates a basic prior art forwarding data structure 320 which maintains associations between addresses 321 and packet senders and receivers 322.

Figure 4A:
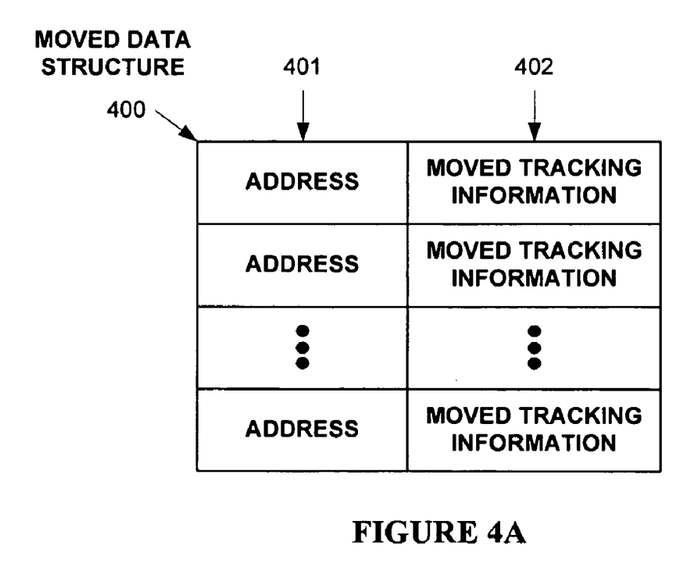
FIG. 4A is a moved data structure used in one embodiment.

FIG. 4A illustrates a moved data structure 400 used in one embodiment for recording the movement of packet receivers for addresses 401. In one embodiment, moved tracking information 402 includes counts or flags identifying the movement over time, typically with the data stored in moved data structure 400 being aged for ease of detecting movement of an amount corresponding to a potential forwarding loop.

Figure 4B:
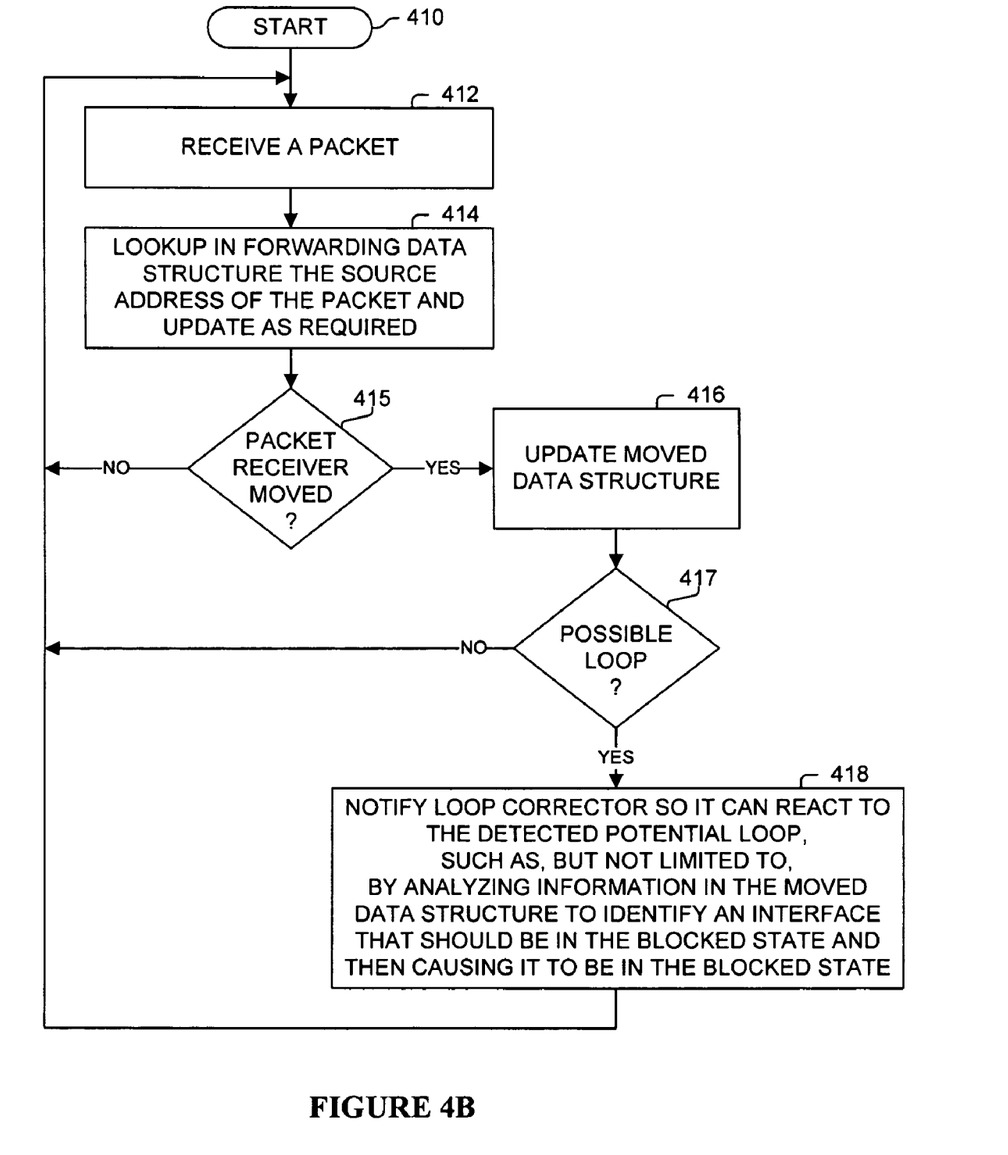
FIG. 4B is flow diagram illustrating a process used in one embodiment for detecting potential forwarding loops.

FIG. 4B illustrates a process used in one embodiment. Processing begins with process block 410, and proceeds to process block 412, wherein a packet is received. In process block 414, a lookup operation is performed in forwarding data structure based on the source address of the packet, with the forwarding data structure being updated as required. As determined in process block 415, if the packet receiver on which the packet was received has moved, then in process block 416, the moved data structure (such as moved data structure 400 of FIG. 4A) is updated accordingly. As determined in process block 417, if a possible loop is determined based on this movement, then in process block 418, loop corrector is notified so that it can react (or cause such reaction) to the detected potential loop, such as, but not limited to, by analyzing information in the moved data structure to identify an interface that should be in the blocked state and causing it to move to the blocked state. Processing returns to process block 412. Of course, the evaluation of the moved data structure can be performed by a separate process, such as that illustrated in FIGS. 4B-C, discussed hereinafter.

Figure 5A:
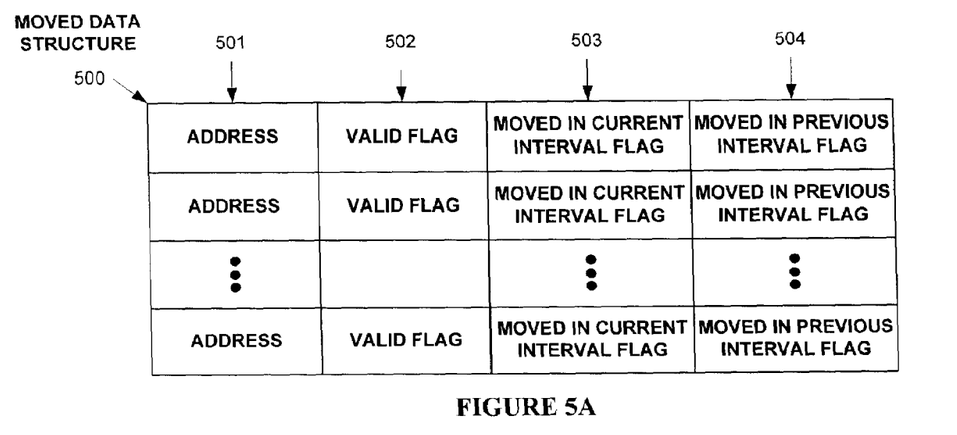
FIG. 5A is a moved data structure used in one embodiment.

FIG. 5A illustrates a moved data structure 500 used in one embodiment for recording the movement of packet receivers for addresses 501. In one embodiment, moved data structure 500 includes for each of its entries an: address field 501 for storing a MAC or other address, a valid flag field 502 indicating whether or not this entry is populated, a moved in current time interval flag field 503, and a moved in previous time interval flag field 504.

Figure 5B:
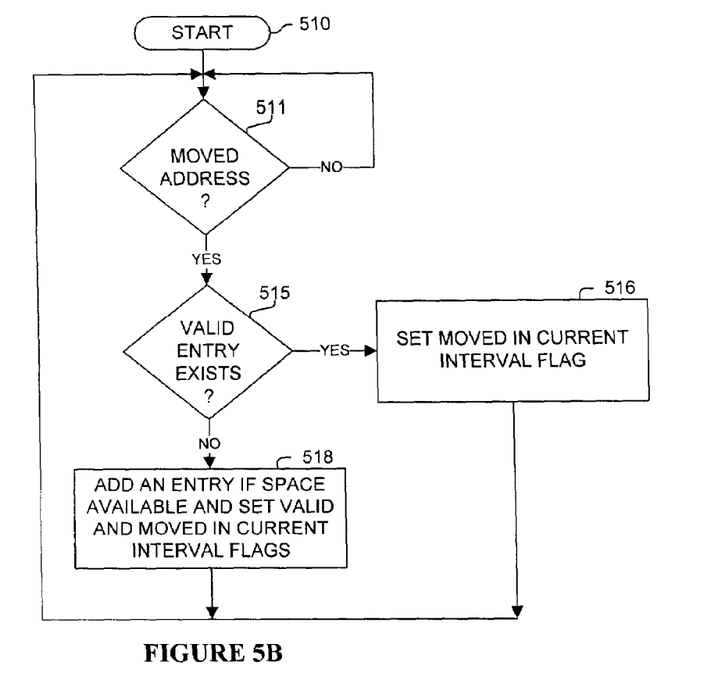
FIGS. 5B-C are flow diagrams illustrating processes used in one embodiment for detecting potential forwarding loops.

FIG. 5B illustrates a process for tracking the movement of ports or other packet receivers for addresses of received packets used in one embodiment. Processing begins with process block 510. As determined in process block 511, if the packet receiver has moved for the source address of a received packet, then as determined in process block 515, if a valid entry already exits in the moved data structure (e.g., moved data structure 500 of FIG. 5A), then this entry is updated in process block 516 by setting the moved in current interval flag; otherwise, in process block 518, an entry is added if there is space available in the moved data structure with its moved in current interval flag being set. Processing returns to process block 511.

Figure 5C:
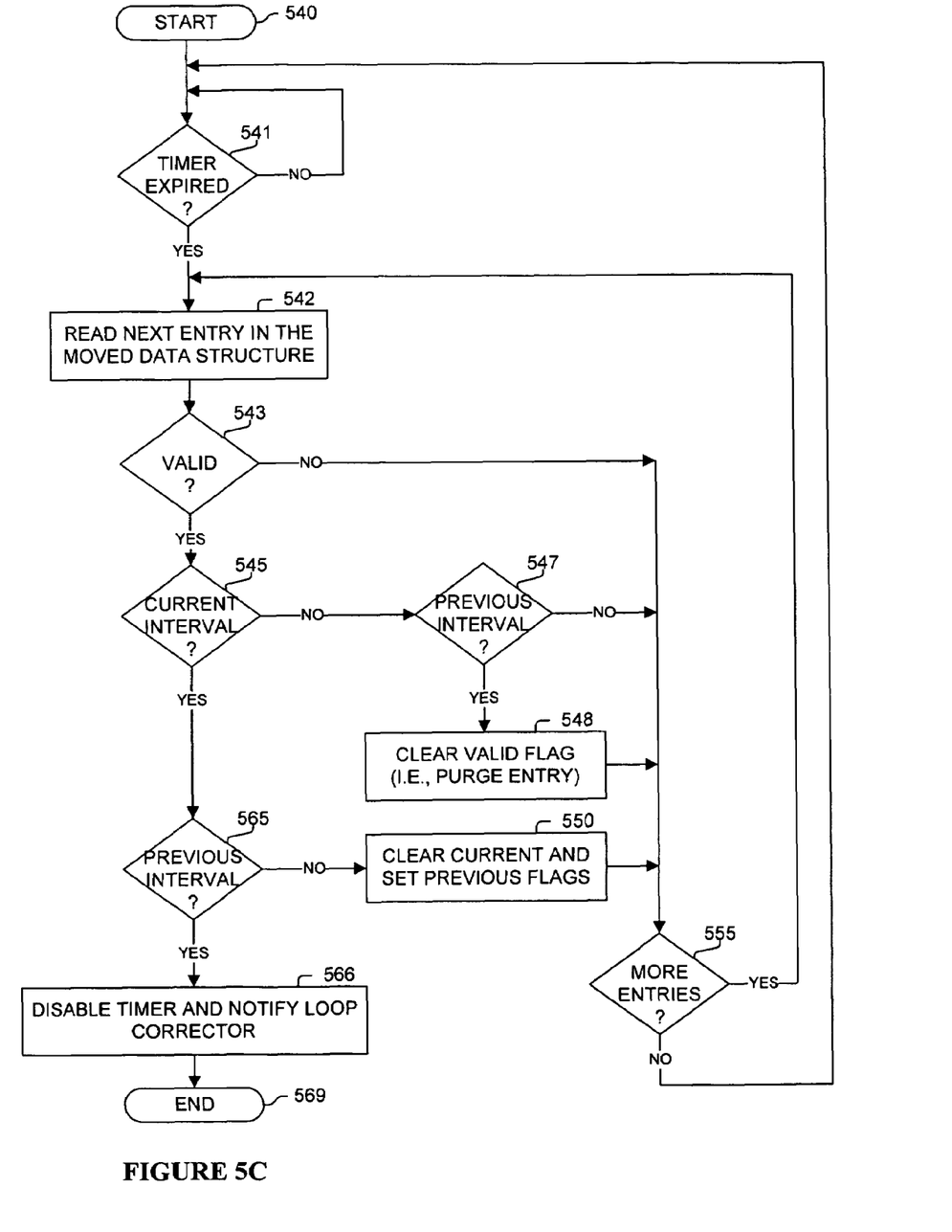

FIG. 5C illustrates a process for analyzing a moved data structure in order to determine potential forwarding loops used in one embodiment. Processing begins with process block 540, and processing loops (or waits) until the timer corresponding to a current time interval has expired, and after which, the entries in the moved data structure are evaluated as follows. In process block 542, the first/next entry in the moved data structure (e.g., moved data structure 500 of FIG. 5A populated by the process illustrated in FIG. 5B) is read. As determined in process block 543, if it is not a valid entry (e.g., it is not populated), then processing proceeds to process block 555.

Otherwise, as determined in process blocks 545 and 547, if the current interval flag is not set indicating that there was not a movement in the current time interval but the previous interval flag is set indicating there was a movement in the previous time interval, then in process block 548, the valid flag for the entry is cleared (i.e., the entry is purged from the moved data structure), and processing proceeds to process block 555. Otherwise, as determined in process blocks 545 and 547, if the current interval flag is not set indicating that there was not a movement in the current time interval and the previous interval flag is not set indicating there was not a movement in the previous time interval, then processing proceeds directly to process block 555.

Otherwise, as determined in process blocks 545 and 565, if the current interval flag is set indicating that there was a movement in the current time interval but the previous interval flag is not set indicating there was not a movement in the previous time interval, then in process block 550, the current interval flag is cleared and the previous interval flag is set, and processing proceeds to process block 555. Otherwise, as determined in process blocks 545 and 565, if the current interval flag is set indicating that there was a movement in the current time interval and the previous interval flag is set indicating there was a movement in the previous time interval, then a potential forwarding loop has been detected as reflected in process block 566, wherein the loop corrector is notified and the timer is disabled so that the information is preserved in the moved data structure to reflect the source of the potential loop; and processing is complete as indicated by process block 569.

When processing has reached process block 555, if there are more entries to process, then processing returns to process block 542; otherwise, processing returns to process block 541.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus configured to identify potential forwarding loops in a network, the apparatus comprising:

a plurality of packet receivers configured to receive packets, with each of said received packets including an address in the source address field in the header of said received packets identifying the source of the packet;

a forwarding data structure configured for storing associations of said addresses with particular packet receivers;

a network topology updater configured to perform Spanning Tree Protocol including sending of Hello messages at intervals of a predetermined Hello time and to update the forwarding data structure;

a moved data structure configured for storing addresses whose corresponding packet receiver has recently moved; and a loop detector configured to manage recently moved addresses using the moved data structure in order to identify a potential routing loop when a movement for a same address has occurred n times within a predefined time duration, with n being an integer of at least two, wherein the predefined time duration is less or equal to approximately twice the Hello time; wherein the loop detector is configured to notify a loop corrector to respond to said identification of the potential routing loop.

2. The apparatus of claim 1, wherein the Hello time is approximately two seconds.

3. The apparatus of claim 1, wherein the Hello time is approximately one second.

4. The apparatus of claim 1, including the loop corrector is configured to be responsive to said identification of the potential routing loop by the loop detector.

5. The apparatus of claim 4, wherein the loop corrector is configured to put a particular packet receiver of said packet receivers in a blocking or disabled state in response to said identification of the potential routing loop by the loop detector.

6. The apparatus of claim 5, wherein the loop corrector is configured to determine the particular packet receiver based on information extracted from the moved data structure.

7. The apparatus of claim 1, wherein said packet receivers are ports of a switching device.

8. An apparatus configured to identify potential forwarding loops in a network, the apparatus comprising:
a plurality of packet receivers configured to receive packets, with each of said received packets including an address in the source address field in the header of said received packets identifying the source of the packet;
a forwarding data structure configured for storing associations of said addresses with particular packet receivers of the plurality of packet receivers;
a moved data structure configured for storing addresses whose corresponding packet receiver of the plurality of packet receivers has recently moved with corresponding one or more indications for identifying movements in different consecutive time intervals; and
a loop detector configured to manage recently moved addresses using the moved data structure so as to identify a potential routing loop when a movement for a same address has occurred in each of k consecutive time intervals, with k being an integer greater than one; wherein the loop detector is configured to notify a loop corrector to respond to said identification of the potential routing loop.

9. The apparatus of claim 8, including a network topology updater configured to perform Spanning Tree Protocol including sending of Hello messages at time intervals of a predetermined Hello time and to update the forwarding data structure; and wherein each of said consecutive time intervals is approximately the predetermined Hello time.

10. The apparatus of claim 8, wherein k is two.

11. The apparatus of claim 8, wherein k is two, and each of said consecutive time intervals is approximately one second.

12. The apparatus of claim 11, including a network topology updater configured to perform Spanning Tree Protocol including sending of Hello messages at time intervals of a predetermined Hello time of approximately one second and to update the forwarding data structure.

13. The apparatus of claim 8, including a network topology updater configured to perform Spanning Tree Protocol, wherein each of said consecutive time intervals is less than half of the predetermined Forwarding Delay for the Spanning Tree Protocol for the apparatus.

14. The apparatus of claim 8, including a network topology updater configured to perform Spanning Tree Protocol, wherein each of said consecutive time intervals is less than one-fourth of the predetermined Forwarding Delay for the Spanning Tree Protocol for the apparatus.

15. The apparatus of claim 8, including a network topology updater configured to perform Spanning Tree Protocol, wherein each of said consecutive time intervals is less than one-tenth of the predetermined Forwarding Delay for the Spanning Tree Protocol for the apparatus.

16. A method performed by a networked packet switching device configured to identify potential forwarding loops in a network, the packet switching device including a plurality of packet receivers, a forwarding data structure configured for storing associations of addresses with packet receivers of the plurality of packet receivers; and a moved data structure configured for storing addresses whose corresponding packet receiver of the plurality of packet receivers has recently moved, the method comprising:
repeatedly: receiving and processing a new particular packet, the particular packet including a particular source address in the source address field in the header of the particular packet identifying the source of the packet; wherein said processing the particular packet includes evaluating the forwarding data structure for the particular source address, and in response to an identification that a particular packet receiver of the plurality of packet receivers associated with the particular source address has moved from a prior particular packet receiver based on the forwarding data structure and the particular source address extracted from the particular packet, updating the moved data structure to reflect that the packet receiver associated with the particular source address has moved; wherein the associated said one of the plurality of packet receivers is updated in the forwarding data structure for the particular source address at least when said move is detected; and
periodically evaluating recently moved addresses in the moved data structure in order to identify a potential routing loop when a movement for a same address has occurred m times within a predefined time duration, with m being an integer of at least two; and in response to said identification of the potential routing loop, notifying a loop corrector configured to respond to said identification of the potential routing loop.

17. The method of claim 16, including performing Spanning Tree Protocol including sending of Hello messages at time intervals of a predetermined Hello time and updating the forwarding data structure; and wherein the predefined time duration is less or equal to approximately twice the Hello time.

18. The method of claim 16, including performing Spanning Tree Protocol including sending of Hello messages at time intervals of a predetermined Hello time and updating the forwarding data structure; and wherein the predefined time duration is less or equal to approximately the Hello time.

19. An apparatus configured to identify potential forwarding loops in a network, the apparatus comprising:
a plurality of packet receivers;
a forwarding data structure configured for storing associations of addresses with packet receivers of the plurality of packet receivers;
a moved data structure configured for storing addresses whose corresponding packet receiver of the plurality of packet receivers has recently moved;

means for repeatedly processing a received new particular packet, the particular packet including a particular source address in the source address field in the header of the particular packet identifying the source of the packet; wherein said processing the particular packet includes evaluating the forwarding data structure for the particular source address, and in response to an identification that a particular packet receiver of the plurality of packet receivers associated with the particular source address has moved from a prior particular packet receiver based on the forwarding data structure and the particular source address extracted from the particular packet, updating the moved data structure to reflect that the packet receiver associated with the particular source address has moved; wherein the associated said one of the plurality of packet receivers is updated in the forwarding data structure for the particular source address at least when said move is detected; and means for identifying a potential routing loop when a movement for a same address has occurred in each of r consecutive time intervals and for notifying a loop corrector to respond to said identification of the potential routing loop, wherein r is an integer greater than one.

20. The apparatus of claim 19, including a network topology updater configured to perform Spanning Tree Protocol including sending of Hello messages at time intervals of a predetermined Hello time and to update the forwarding data structure; and wherein each of said consecutive time intervals is approximately the predetermined Hello time.

21. The apparatus of claim 20 wherein r is two.

22. The apparatus of claim 19, wherein r is two, and each of said consecutive time intervals is approximately one second.

23. The apparatus of claim 22, including a network topology updater configured to perform Spanning Tree Protocol including sending of Hello messages at time intervals of a predetermined Hello time of approximately one second and to update the forwarding data structure.

24. The apparatus of claim 19, including a network topology updater configured to perform Spanning Tree Protocol, wherein each of said consecutive time intervals is less than half of the predetermined Forwarding Delay for the Spanning Tree Protocol for the apparatus.

25. The apparatus of claim 19, including a network topology updater configured to perform Spanning Tree Protocol, wherein each of said consecutive time intervals is less than one-fourth of the predetermined Forwarding Delay for the Spanning Tree Protocol for the apparatus.

26. The apparatus of claim 19, including a network topology updater configured to perform Spanning Tree Protocol, wherein each of said consecutive time intervals is less than one-tenth of the predetermined Forwarding Delay for the Spanning Tree Protocol for the apparatus.

* * * * *